(12) United States Patent
Chung

(10) Patent No.: US 7,394,596 B1
(45) Date of Patent: Jul. 1, 2008

(54) PLANE LENS SHEET USING LIGHT TRANSMISSION RATE DIFFERENCE

(76) Inventor: Hyunin Chung, 242-246, Eungam-dong, Eunpyeong-gu, Seoul (KR)

(*) Notice: Subject to any disclaimer, the term of this patent is extended or adjusted under 35 U.S.C. 154(b) by 5 days.

(21) Appl. No.: 11/737,221

(22) Filed: Apr. 19, 2007

(30) Foreign Application Priority Data

Dec. 29, 2006 (KR) .................. 10-2006-0138521

(51) Int. Cl.
*G02B 27/10* (2006.01)
*G03B 21/60* (2006.01)

(52) U.S. Cl. .................................... 359/619
(58) Field of Classification Search ......... 359/454–455, 359/619–623, 599
See application file for complete search history.

(56) References Cited

U.S. PATENT DOCUMENTS 3,528,723 A * 9/1970 Rogers ................. 359/497

* cited by examiner

Primary Examiner—Alicia M Harrington
(74) Attorney, Agent, or Firm—Ladas & Parry LLP

(57) ABSTRACT

Disclosed herein is a plane lens sheet using a light transmission rate difference, which is used for stereoscopic printing for a lenticular system and an integral photography method and has a plane surface while innumerable lenses are arranged on the surface there so that it looks like a flat transparent sheet, improves the quality of stereoscopic products employing the lens sheet and facilitates the maintenance of the stereoscopic products. The plane lens sheet includes: a concave lens layer 20 and a convex lens layer 30 laminated on each other in such a manner as the adhere to each other with the same radius curvature to form a superposed lens sheet, the concave lens layer 20 and the convex lens layer 30 being made of a transparent synthetic resin and having the same lens pitch and different light transmission rates; a thin flat transparent upper protection layer 10 formed on the concave lens layer 20; a transparent layer 50 formed below the convex lens layer 30 for forming the focal length of the laminated concave lens layer and convex lens layer; and a thin flat transparent lower protection layer 70 formed below the transparent layer 50.

5 Claims, 9 Drawing Sheets

PLANE LENS SHEET USING LIGHT TRANSMISSION RATE DIFFERENCE

BACKGROUND OF THE INVENTION

1. Field of the Invention

The present invention relates to a lane lens sheet using a light transmission rate difference, and more particularly, to a plane lens sheet using a light transmission rate difference, which is used for stereoscopic printing for a lenticular system and an integral photography method and has a plane surface while innumerable lenses are arranged on the surface thereof so that it looks like a flat transparent sheet, improves the quality of stereoscopic products employing the lens sheet and facilitates the maintenance of the stereoscopic products.

2. Background of the Related Art

Generally, a stereo lens sheet includes innumerable lenses formed in a pattern on its surface so that the surface looks embossed. The lenses of the stereo lens sheet are used to obtain refractive effect. However, the surface of the stereo lens sheet is embossed because of the lenses formed thereon, and thus there are many problems in manufacturing products employing the stereo lens sheet and managing the products. That is, particles collect between embossed portions on the surface of the lens sheet and they are difficult to remove by cleaning. Accordingly, the transparency of the lens sheet is deteriorated so that the life span of the lens sheet is shortened.

Furthermore, the embossed surface of the lens sheet causes diffused reflection so that products employing the lens sheet look lusterless. Thus it is difficult to produce a lustrous lens sheet.

A stereoscopic printing lens sheet has a lens pitch that determines the resolution of a three-dimensional (3D) object. The correlation of the resolution of the stereo graphic and sense of depth is obtained based on the lens pitch. When the lens pitch is increased, the interval of lenses of the lens sheet is widened, which means the lenses have a large size. Thus, the resolution of stereo graphic seems poor while the sense of depth seems improved when the stereo graphic is seen with the naked eye.

Accordingly, to improve both resolution and sense of depth, a method of increasing the radiuses of curvature of the lenses of the lens sheet was used to improve the sense of depth while narrowed the interval of the lenses. However, this method narrows a 3D object recognition angle though it improves resolution and sense of depth.

SUMMARY OF THE INVENTION

Accordingly, the present invention has been made in view of the above-mentioned problems occurring in the prior art, and it is a primary object of the present invention to provide a plane lens sheet using a light transmission rate difference, which has a perfectly plane surface to prevent foreign substances from being collected between lenses and remove surface diffused reflection generated in the lens sheet to reproduce highly lustrous vivid colors and gives a higher resolution and a better sense of depth as compared to the conventional stereoscopic printing lens sheet.

To accomplish the above object of the present invention, there is provided a plane lens sheet using a light transmission rate difference comprising: a concave lens layer and a convex lens layer laminated on each other in such a manner as to adhere to each other with the same radius curvature to form a superposed lens sheet, the concave lens layer and the convex lens layer being made of a transparent synthetic resin and having the same lens pitch and different light transmission rates; a thin flat transparent upper protection layer formed on the concave lens layer; a transparent layer formed below the convex lens layer for forming the focal length of the laminated concave lens layer and convex lens layer; and a thin flat transparent lower protection layer formed below the transparent layer.

BRIEF DESCRIPTION OF THE DRAWINGS

The above and the other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
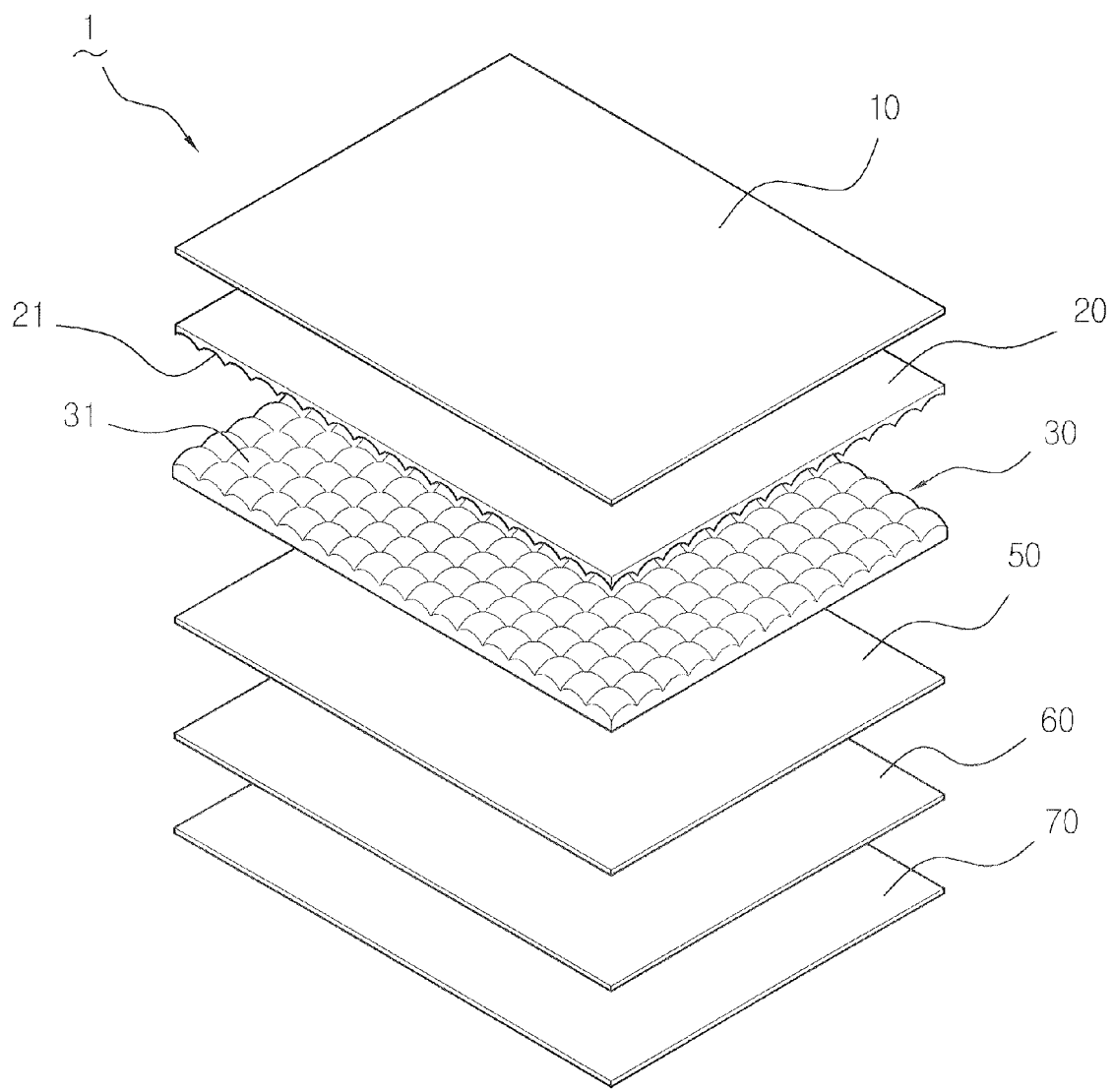
FIG. 1 is an exploded perspective view of a plane lens sheet according to an embodiment of the present invention.
Figure 2:
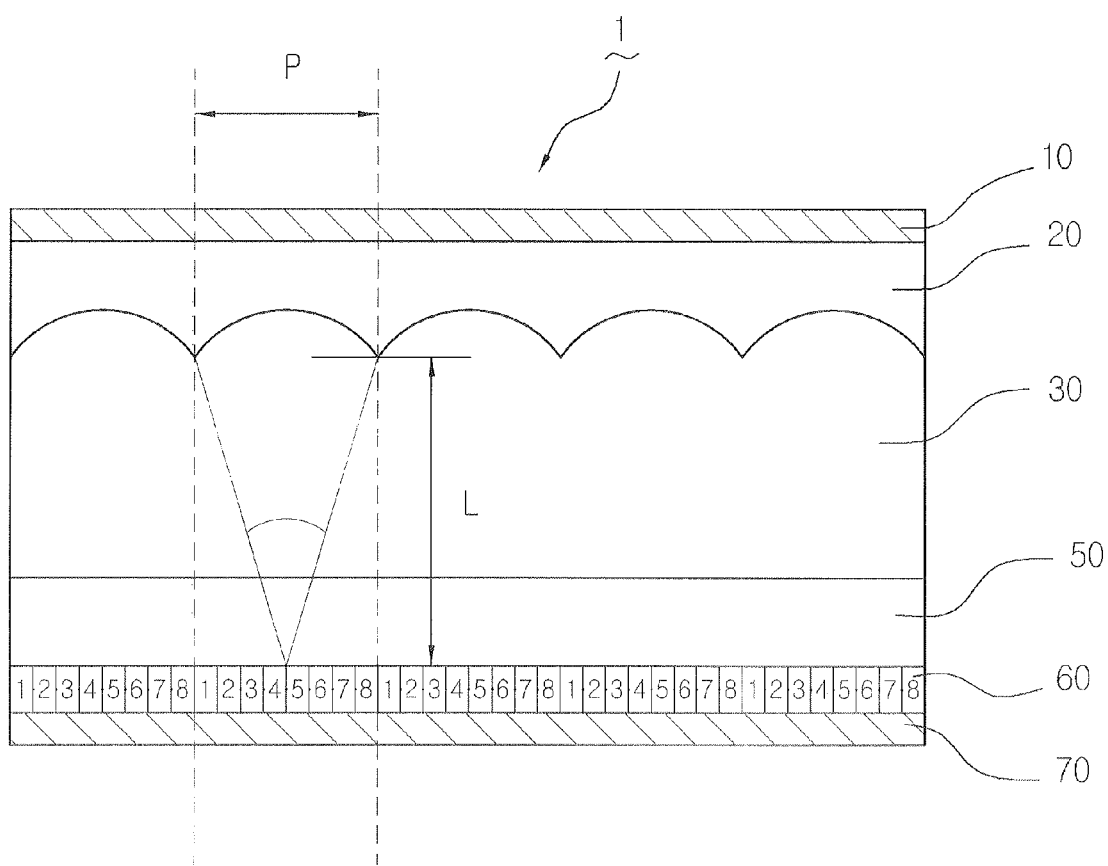
FIG. 2 is a cross-sectional view of the plane lens sheet according to an embodiment of the present invention.

The present invention will now be described more fully with reference to the accompanying drawings, in which exemplary embodiments of the invention are shown.

As shown in FIGS. 1 through 9, a plane lens sheet 1 according to the present invention includes a convex lens layer 30. The convex lens layer 30 is formed by molding a transparent synthetic resin into hemispherical convex lenses 31 arranged in every direction. The convex lenses 31 are arranged in such a manner that a cross angle of virtual lines passing the centers of the convex lenses 31 makes 60° or 90°.

A concave lens layer 20 is formed on the convex lens layer 30. The concave lens layer 20 is made of a transparent synthetic resin and has a light transmission rate different from that of the convex lens layer 30. The concave lens layer 20 includes concave lenses 21 that have the same radius of curvature as that of the convex lenses 31 and are arranged in the same manner as the convex lenses 31. The concave lenses 21 adhere to the convex lenses 31. The present invention is characterized in that the convex lens layer 31 and the concave lens layer 21 are formed of a transparent synthetic resin having different light transmission rates.

A thin flat upper protection layer 10 is coated on the concave lens layer 20. A transparent layer 50 is located below the convex lens layer 30. The transparent layer 50 is in the form of a sheet with a thickness corresponding to the focal length of the convex lenses 31. The transparent layer 50 may be integrated with the convex lens layer 30. In this case, the convex lens layer 30 is formed in a thickness corresponding to the focal length of the convex lenses 31.

Figure 7:
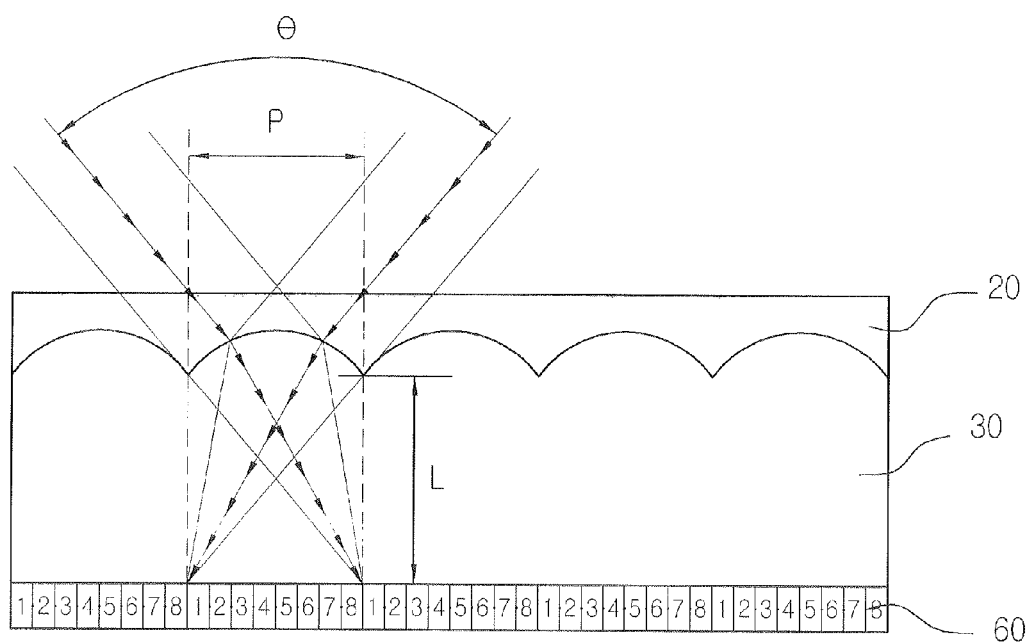
FIG. 7 is a cross-sectional view showing a maximum effective angle representing stereo graphic in the plane lens sheet according to the present invention.
Figure 8:
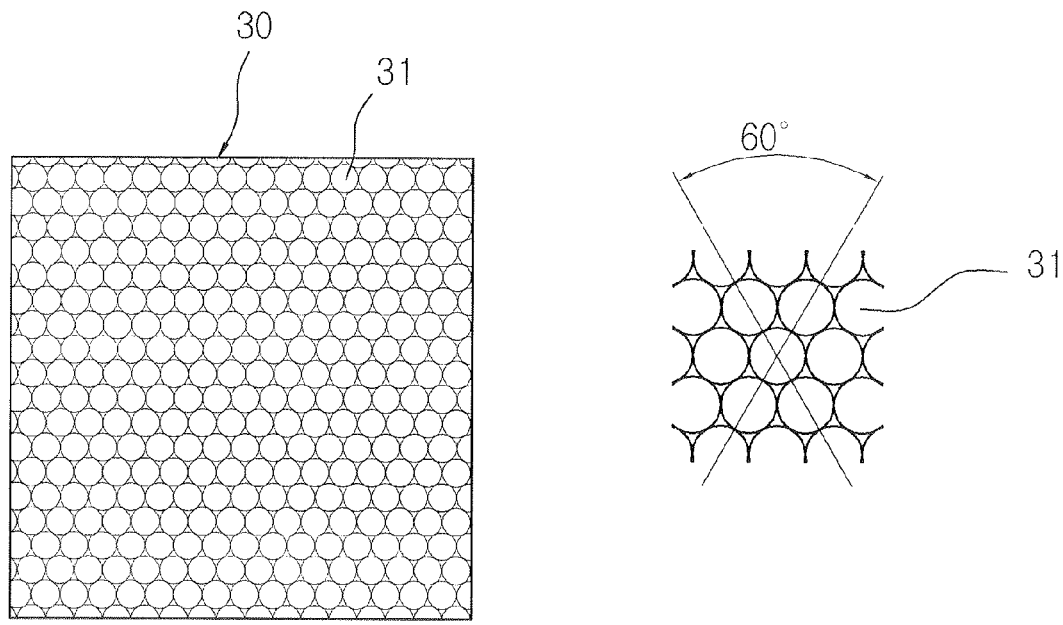
FIG. 8 is a plan view of a lens pattern array according to integral photography, which is used in the plane lens sheet according to an embodiment of the present invention.
Figure 8:
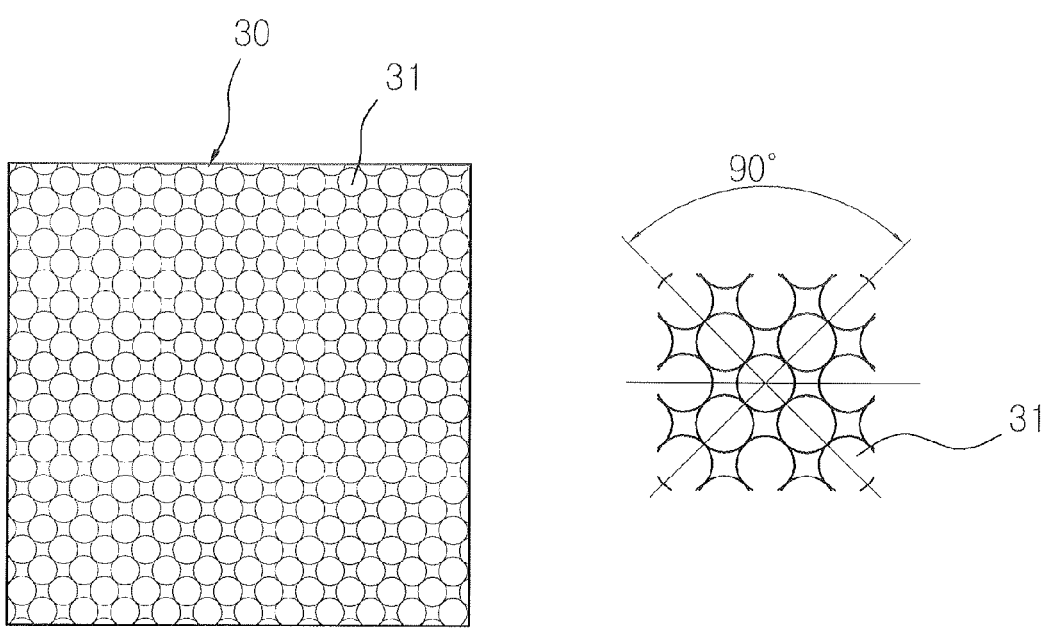
Figure 9:
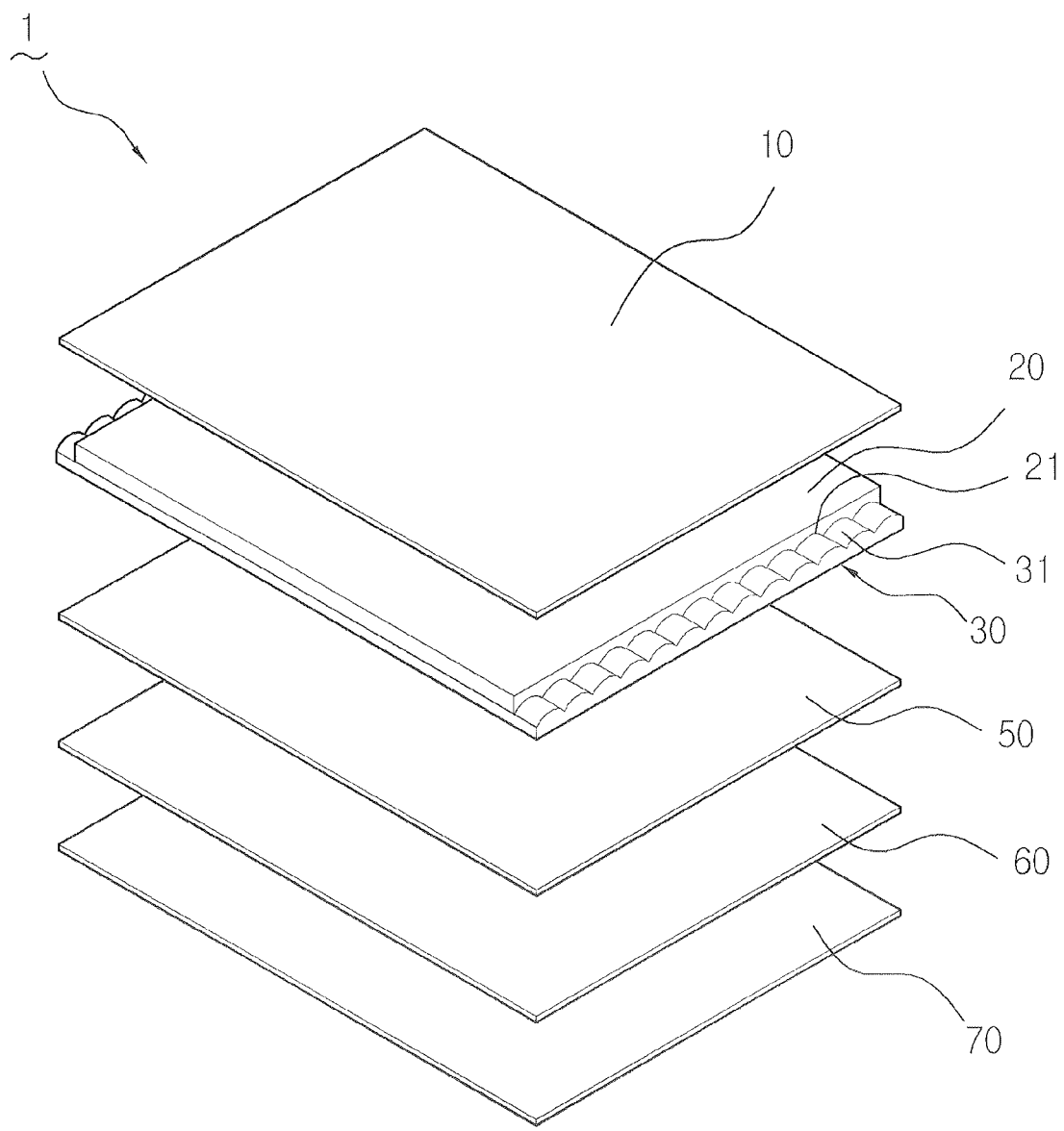
FIG. 9 is an exploded perspective view of a plane lens sheet according to another embodiment of the present invention.

A thin flat transparent lower protection layer 70 is coated on the bottom face of the transparent layer 50. A focal length printing layer 60 is printed on the bottom face of the transparent layer 50. The focal length printing layer 60 is represented as an image formed by computer graphics. The image must be located at the focal points of the convex lenses 31 such that an observer can sequentially see images divided based on the pitch of the convex lenses 31 when focal regions are magnified, as shown in FIG. 7. The focal length printing layer 60 may be formed below the lower protection layer 70.

Figure 5:
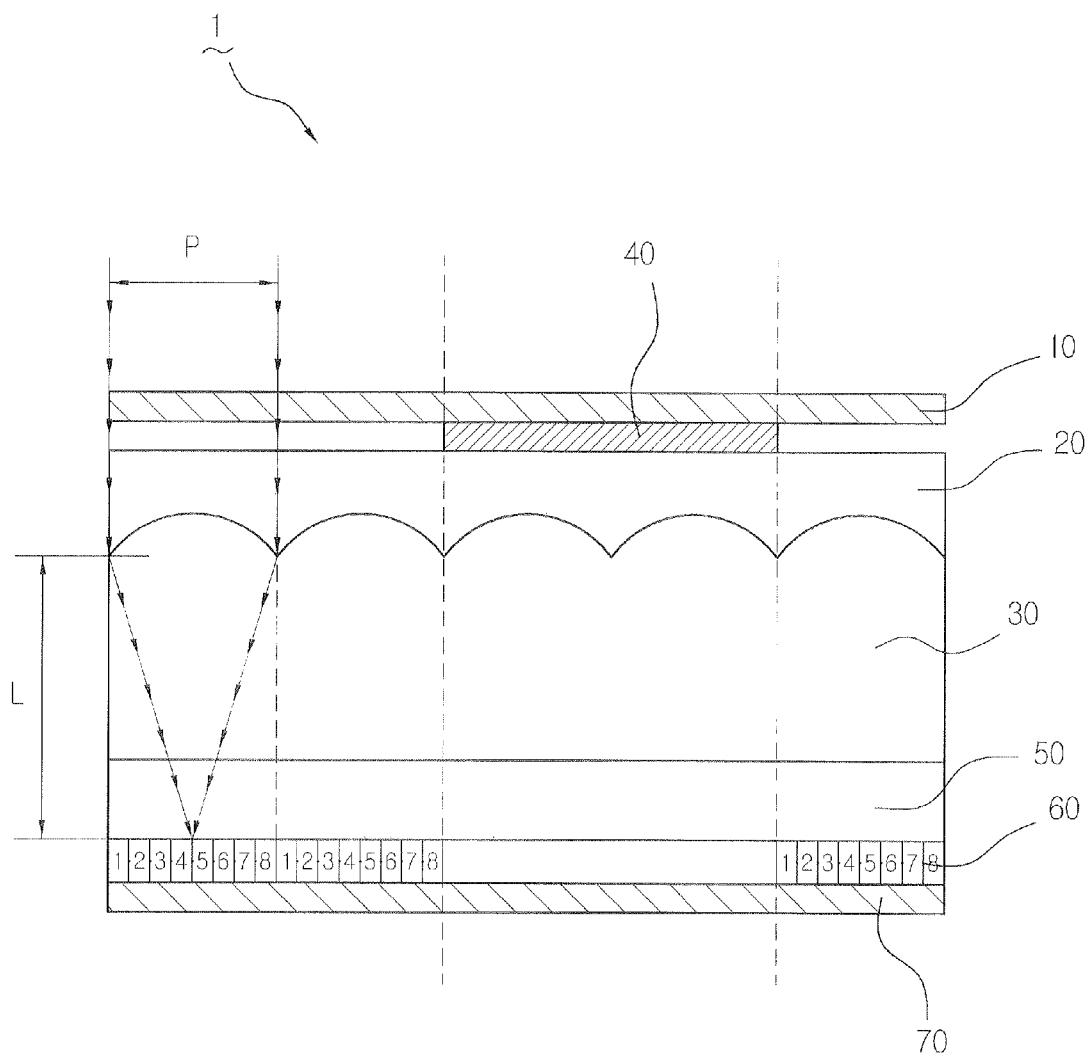
FIG. 5 is a cross-sectional view of a plane lens sheet according to another embodiment of the present invention.
Figure 6:
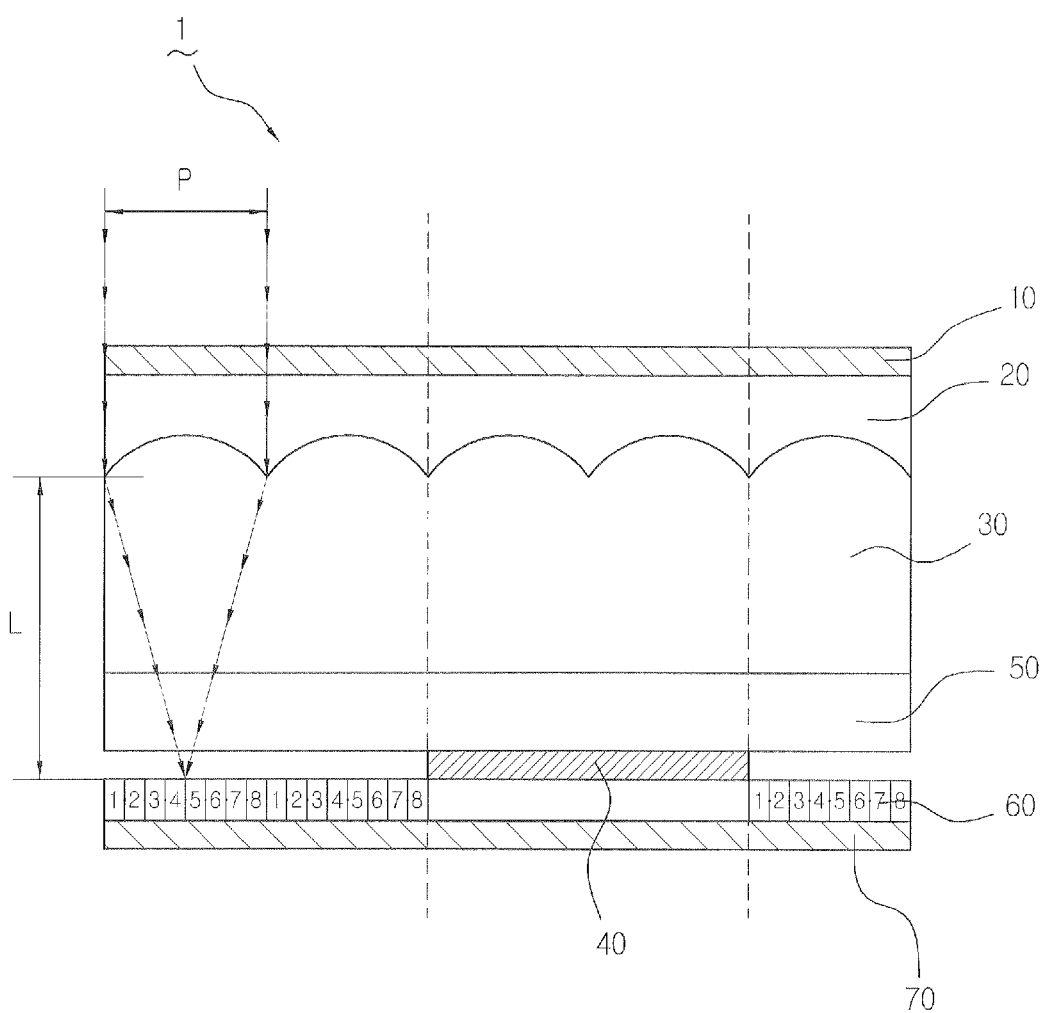
FIG. 6 is a cross-sectional view of a plane lens sheet according to another embodiment of the present invention.

A non-focal length printing layer 40 (shown in FIGS. 5 and 6) is printed on the surface of the concave lens layer 20, the surface of the upper protection layer 10 or the bottom face of the convex lens layer 30. The non-focal length printing layer 40 is not stereo- or special-effect-processed. The non-focal length printing layer 40 is used to minimize Moire generated from the correlation of offset printing halftone dots and the convex lenses 31 and represent distinct pictures. That is, a new printing layer is formed in a region out of the focal regions of the convex lenses 31 to improve sense of depth and definition. Accordingly, the non-focal length printing layer 40 can be located in regions as shown in FIGS. 5 and 6 or other regions according to its use.

The convex lenses 31 of the convex lens layer 30 and the concave lenses 21 of the concave lens layer 20 can be arranged in a lenticular mode in which lenses are continuously arranged in a semi-cylindrical shape.

The plane lens sheet 1 according to the present invention includes the convex lens layer 30 and the concave lens layer 20, which are made of a transparent synthetic resin having different light transmission rates and adhere to each other, performs cubic special effect and compensates for shortcomings of the conventional stereoscopic printing lens sheet.

Figure 3:
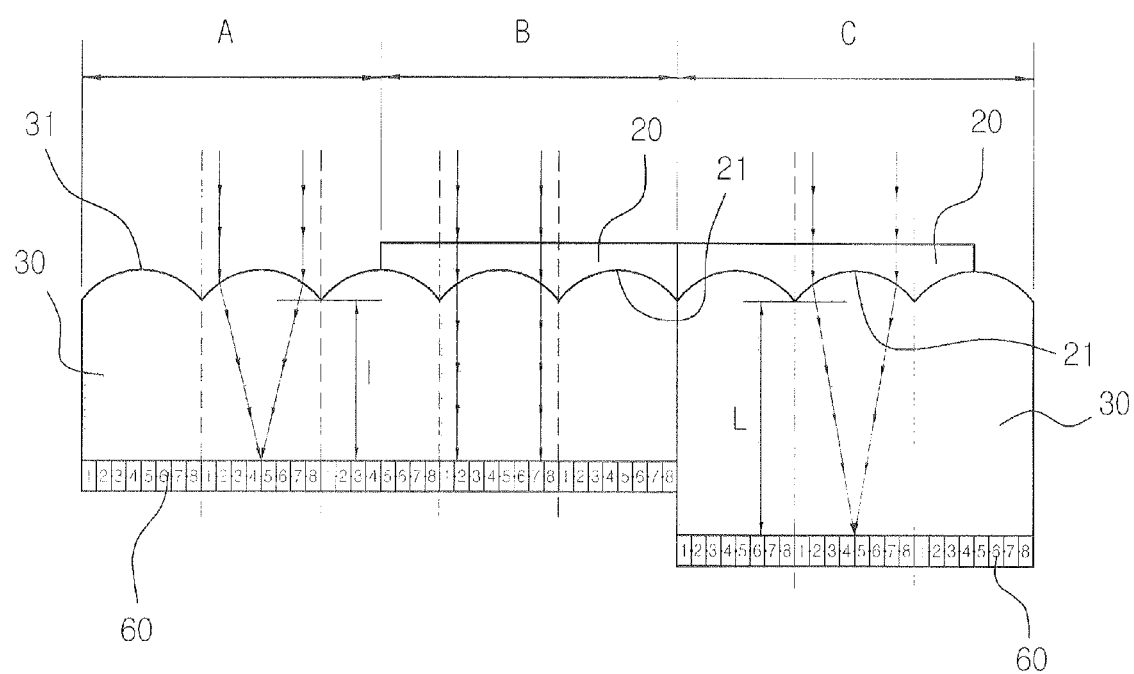
FIG. 3 is a cross-sectional view showing transmission and refraction of light in a conventional stereoscopic printing lens sheet and the plane lens sheet according to the present invention.

Referring to FIG. 3, a portion A shows transmission and refraction directions of light in a conventional stereoscopic printing lens sheet, which explains that the normal magnifying glass effect is obtained. In the conventional stereoscopic printing lens sheet, however, the surfaces of the convex lenses 31 are exposed so that particles can easily collect between lenses and diffused reflection occurs according to the radiuses of curvatures of the convex lenses 31. This diffused reflection hinders the expression of the color of the focal length printing layer 60 and deteriorates the quality of products using the stereoscopic printing lens sheet. This problem can be solved by coating a transparent material on the convex lenses 31 to flatten the surface of the convex lens layer 30.

However, when the transparent material is coated on the convex lenses 31 made of a transparent material to fill up valleys between convex lenses, the convex lens layer looks a transparent flat sheet like a glass plate. Thus, when the concave lens 21 are superposed on the convex lenses 31 having the same light transmission rate as that of the concave lenses 21, the unique characteristic of the lenses disappears so that light transmits the convex lens layer 30 without being refracted, as shown in a portion B of FIG. 3.

To solve the aforementioned problem, it is required that the transparent material coated on the convex lens layer 30 not only fills up valleys between convex lenses 31 but also serve as another lens. As shown in a portion C of FIG. 3, when the concave lenses 21 having a light transmission rate different from that of the convex lenses 31 are located on the convex lens layer 30 and light is transmitted, a focal point is formed although the focal length L is longer than the focal length I of the conventional stereoscopic printing lens sheet shown in the portion A of FIG. 3 between the light transmission rate of the concave lens layer 20 is higher than that of the convex lens layer 30.

An increase in the focal length can create a new advantage. That is, the radius of curvature of the convex lens 31 is increased to lengthen the focal length of the lens sheet in order to improve the sense of depth in a prior art. In this case, the maximum stereo recognition effective angle θ of the observer is narrowed, as shown in FIG. 7.

However, the present invention uses the refraction of light of the concave lens 21 instead of increasing the radius of curvature of the convex lens 31, and thus it is possible to maintain or increase the maximum stereo recognition effective angle θ of the observer while maintaining the lens pitch determining the resolution of the lens sheet.

Figure 4:
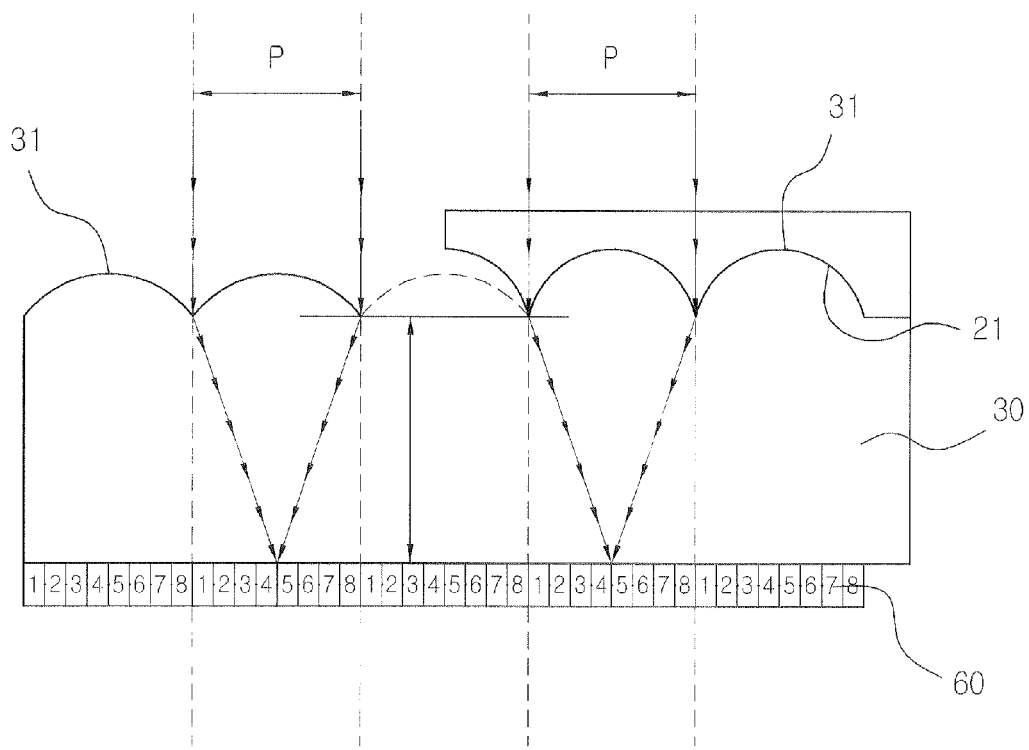
FIG. 4 is a cross-sectional view showing a focus forming process according to refraction of light in the plane lens sheet according to the present invention.

If the increase in the focal length of the convex lens 31 increases the thickness of the product employing the lens sheet and material consumption and raises the manufacturing cost of the product, the plane lens sheet according to the present invention can be manufactured such that it has the same thickness as the conventional stereoscopic printing lens sheet. That is, the radius of curvature of the convex lens 31 is decreased while maintaining the lens pitch, as shown in FIG. 4.

As described above, in the plane lens sheet using a light transmission rate difference according to the present invention, the surface of the convex lens layer 30 is flattened to prevent foreign substances from being collected in a gap between neighboring convex lenses 31 to distinctly represent graphic images of the focal length printing layer 60 expressing the sense of depth. Furthermore, surface diffused reflection generated in the conventional lens sheet is removed to reproduce highly lustrous vivid colors. Moreover, a higher resolution and a better sense of depth of the lens sheet can be provided as compared to the conventional stereoscopic printing lens sheet.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A plane lens sheet using a light transmission rate difference comprising:
   a concave lens layer and a convex lens layer laminated on each other in such a manner as to adhere to each other with the same radius curvature to form a superposed lens sheet, the concave lens layer and the convex lens layer being made of a transparent synthetic resin and having the same lens pitch and different light transmission rates;
   a thin flat transparent upper protection layer formed on the concave lens layer;
   a transparent layer formed below the convex lens layer for forming the focal length of the laminated concave lens layer and convex lens layer; and
   a thin flat transparent lower protection layer formed below the transparent layer.

2. The plane lens sheet using a light transmission rate difference according to claim 1, wherein the convex lens layer and the transparent layer are formed integrally with each other so that the convex lens layer is formed in a thickness corresponding to the focal length of convex lenses forming the convex lens layer.

3. The plane lens sheet using a light transmission rate difference according to claim 1 or 2, wherein the convex lenses of the convex lens layer and concave lenses of the concave lens layer are arranged in a lenticular mode in which the lenses are continuously arranged in a semi-cylindrical shape.

4. The plane lens sheet using a light transmission rate difference according to any one of claims 1 to 3, wherein a focal length printing layer for expressing a sense of depth is printed on the top or bottom face of the lower protection layer.

5. The plane lens sheet using a light transmission rate difference according to any one of claims 1, 2 and 3, wherein a non-focal length printing layer is printed on the top face of the concave lens layer, the top face of the upper protection layer or the bottom face of the convex lens layer.

* * * * *